(12) United States Patent
Kwon

(10) Patent No.: US 12,469,091 B2
(45) Date of Patent: Nov. 11, 2025

(54) APPARATUS AND METHOD FOR PROVIDING RESTAURANT SERVICE BASED ON USER LOCATION USING BEACONS

(71) Applicant: TORDER Co., Ltd., Seoul (KR)

(72) Inventor: Seong Taek Kwon, Seoul (KR)

(73) Assignee: TORDER Co., Ltd., Seoul (KR)

( * ) Notice: Subject to any disclaimer, the term of this patent is extended or adjusted under 35 U.S.C. 154(b) by 289 days.

(21) Appl. No.: 18/200,962

(22) Filed: May 23, 2023

(65) Prior Publication Data

US 2023/0385963 A1 Nov. 30, 2023

(30) Foreign Application Priority Data

May 24, 2022 (KR) .......................... 10-2022-0063578

(51) Int. Cl.
*G06Q 50/00* (2024.01)
*G06Q 30/0601* (2023.01)
(Continued)

(52) U.S. Cl.
CPC ......... *G06Q 50/12* (2013.01); *G06Q 30/0633* (2013.01); *H04W 4/029* (2018.02)

(58) Field of Classification Search
CPC .............. G06Q 50/12; G06Q 30/0633; G06Q 30/0261; G06Q 50/10; H04W 4/029;
(Continued)

(56) References Cited

U.S. PATENT DOCUMENTS

| 2015/0105099 A1* | 4/2015 | Luo | ........................ | H04W 64/00 455/456.1 |
|---|---|---|---|---|
| 2020/0045497 A1* | 2/2020 | Kang | ...................... | H04W 4/21 |

FOREIGN PATENT DOCUMENTS

| KR | 10-2016-0090199 A | 7/2016 |
|---|---|---|
| KR | 10-1643578 B1 | 7/2016 |

(Continued)

OTHER PUBLICATIONS

Decision of Registration for KR 10-2022-0063578 dated Sep. 27, 2022.

(Continued)

*Primary Examiner* — Rokib Masud
(74) *Attorney, Agent, or Firm* — Sughrue Mion, PLLC

(57) ABSTRACT

An apparatus and method for providing a restaurant service based on user location using beacons are disclosed. According to an embodiment, an electronic device may include a memory and a processor connected to the memory. The processor may be configured to receive, from a user terminal, a plurality of beacon identification signals transmitted from a plurality of beacons, extract a first location of the user terminal based, transmit, when the first location is an outside point of the restaurant, first content corresponding to event information, menu information, empty seat information, and waiting time information related to the restaurant, and transmit, when the first location is an inside point of the restaurant, second content corresponding to representative visitor list information about members of a group, visit confirmation request information related to the restaurant, and group member count request information about the number of the members, to the user terminal.

3 Claims, 7 Drawing Sheets

(51) Int. Cl.
*G06Q 50/12* (2012.01)
*H04W 4/029* (2018.01)

(58) Field of Classification Search
CPC ........... H04W 4/023; H04W 4/80; G01S 1/02; G01S 5/0252
See application file for complete search history.

(56) References Cited

FOREIGN PATENT DOCUMENTS

| | | |
|---|---|---|
| KR | 10-2017-0043209 A | 4/2017 |
| KR | 10-1788464 B1 | 10/2017 |
| KR | 10-2019-0006363 A | 1/2019 |
| KR | 10-2317183 B1 | 10/2021 |
| KR | 10-2400120 B1 | 5/2022 |

OTHER PUBLICATIONS

Notice of Preliminary Examination Results for 10-2022-0063578 dated Jul. 17, 2022.

* cited by examiner

【Fig. 1】
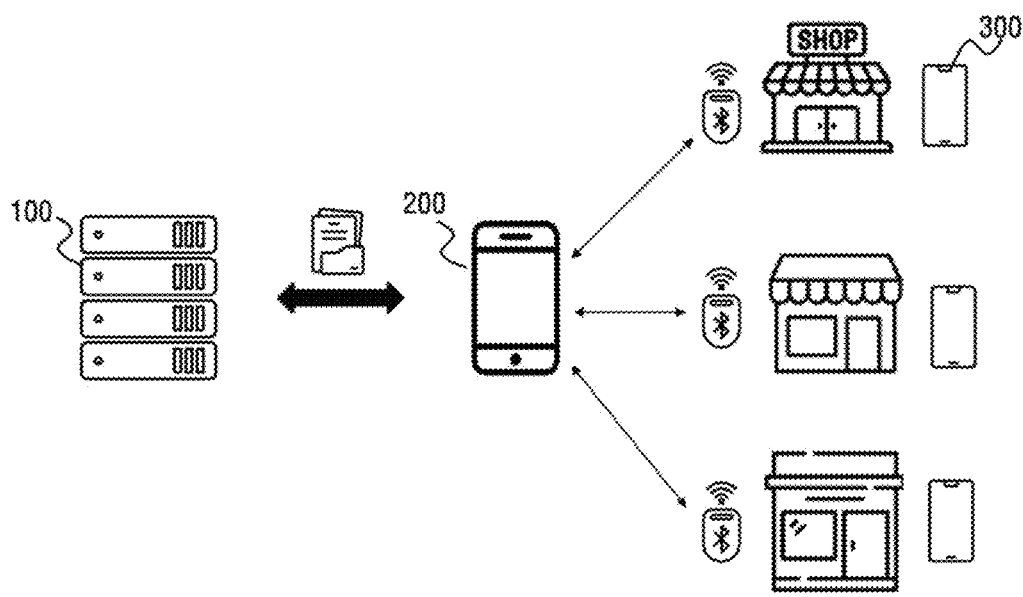
【Fig. 2】
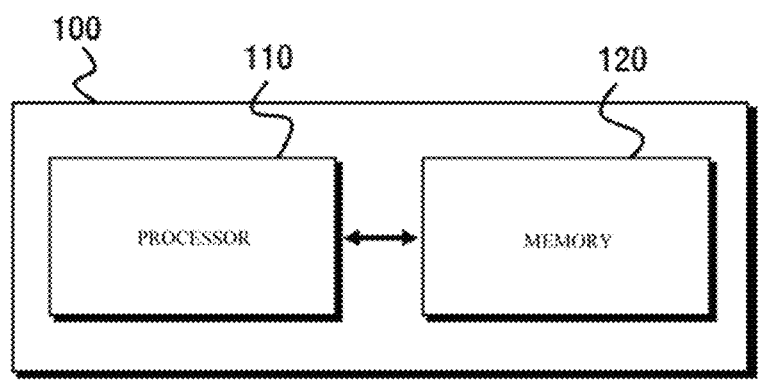

[Fig. 3]
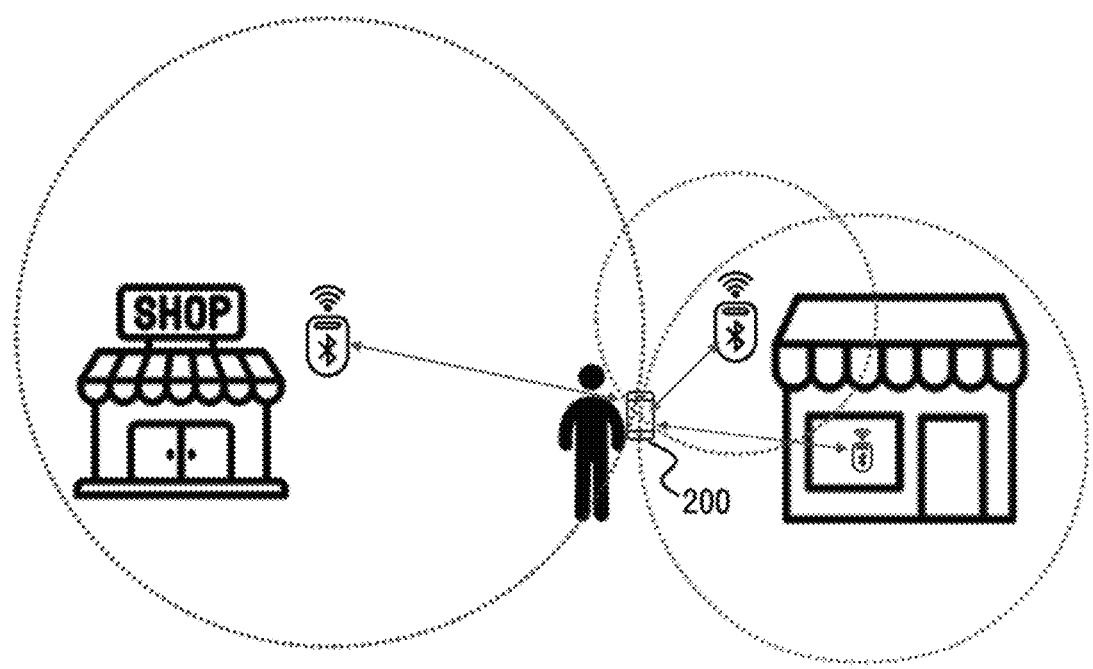

[Fig. 4]
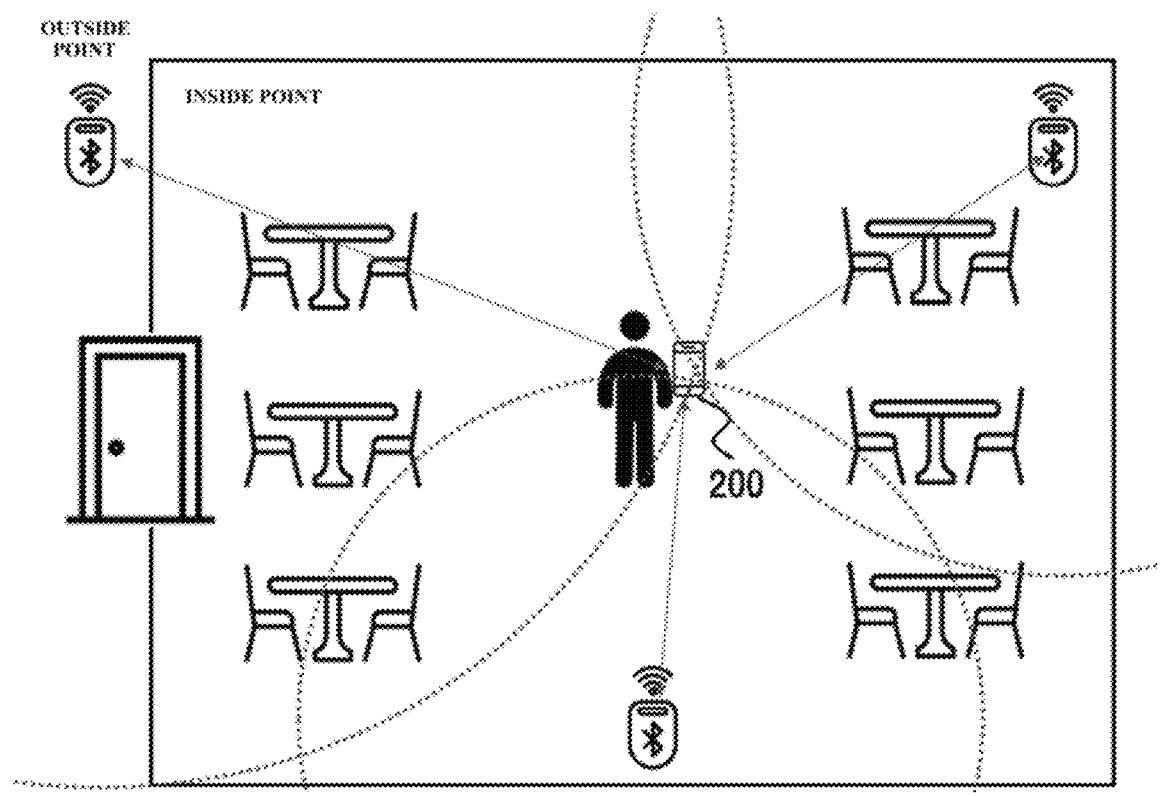

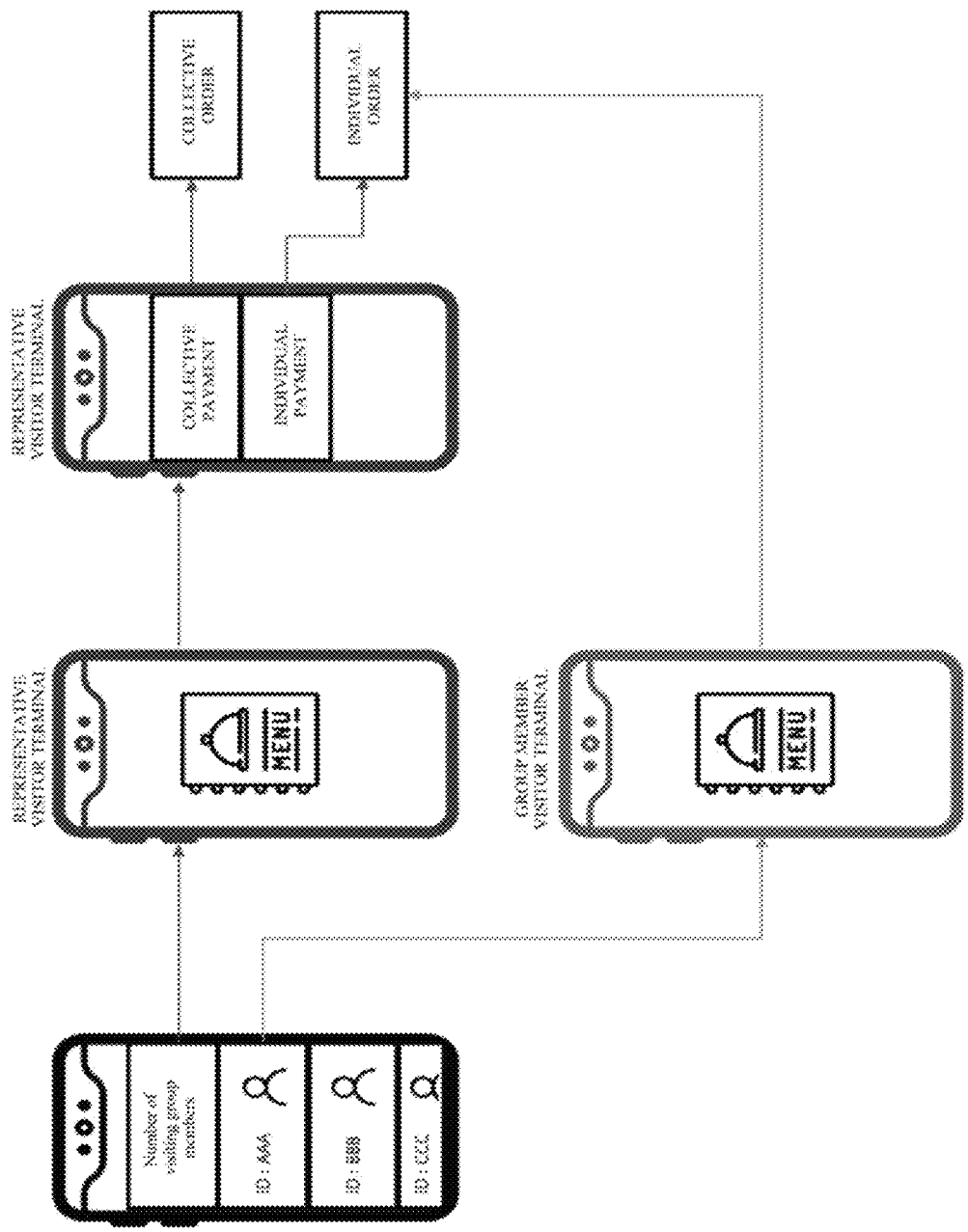
[FIG. 5]

[Fig. 6]
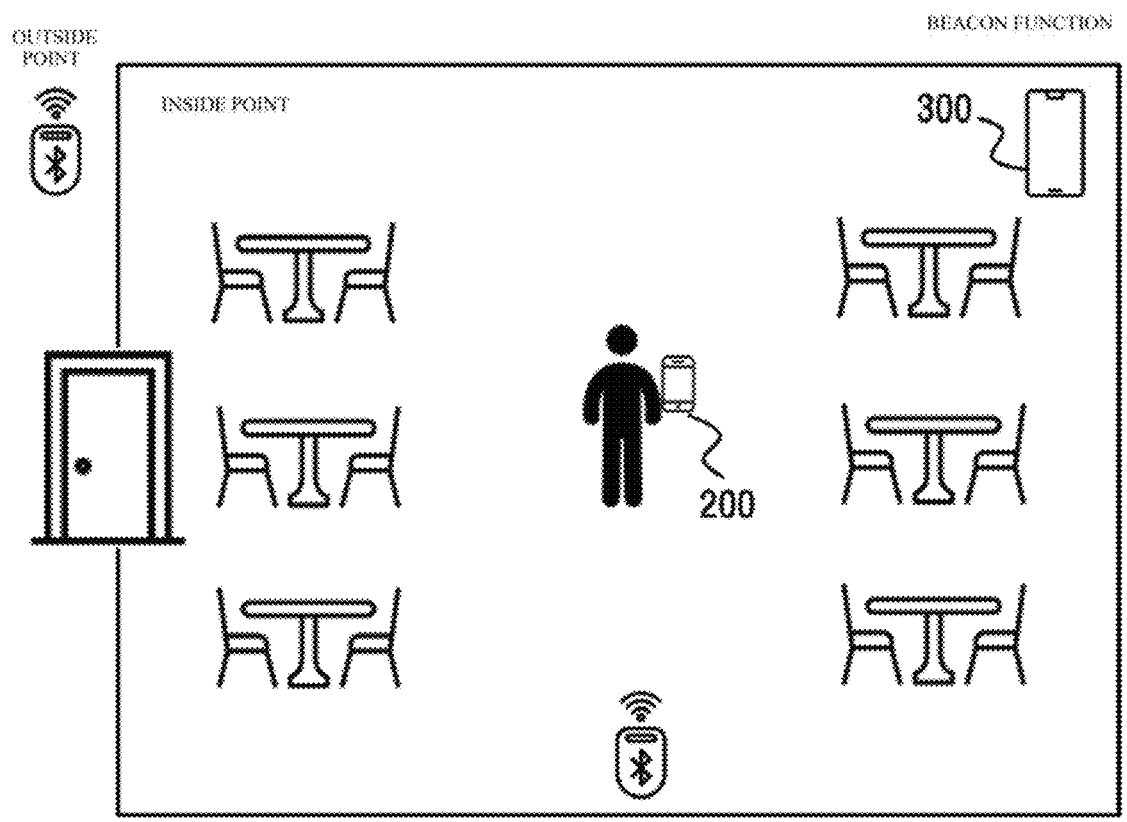

[Fig. 7]
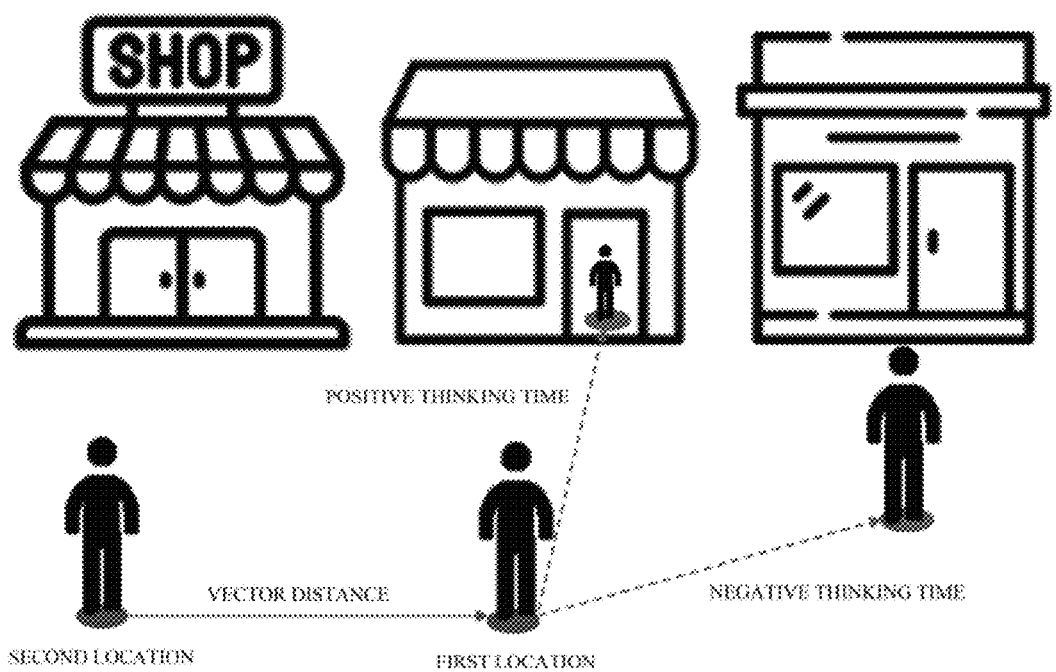

[Fig. 8]
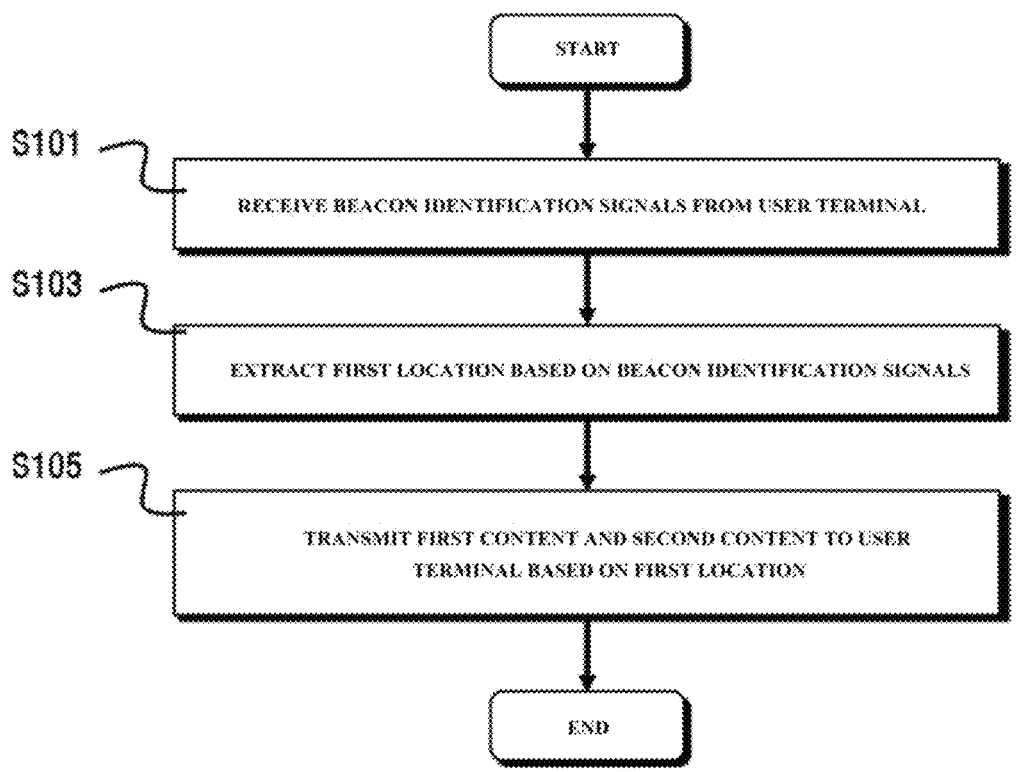

APPARATUS AND METHOD FOR PROVIDING RESTAURANT SERVICE BASED ON USER LOCATION USING BEACONS

CROSS-REFERENCE TO RELATED APPLICATION

This application claims priority to and the benefit of Korean Patent Application No. 10-2022-0063578, filed on May 24, 2022, the disclosure of which is incorporated herein by reference in its entirety.

BACKGROUND

1. Field of the Invention

The present disclosure relates to near field communication. More specifically, the disclosure relates to an apparatus and method for providing a restaurant service based on user location using beacons.

2. Description of the Related Art

The present disclosure relates to near field communication. More specifically, the disclosure relates to an apparatus and method for providing restaurant services based on user location using beacons.

A beacon refers to a technology that sends out a radio signal to nearby devices to determine their locations. A beacon, which refers to a small electronic device, relies on Bluetooth Low Energy (BLE) technology to operate. Beacons, which are mainly used insides, send out signals to nearby devices that can detect the signals to determine the location of a user or device.

Beacons are mainly classified into two types. The first type is one-way beacons, which are beacons that can only be received, and the second type is two-way beacons, which are beacons that can be transmitted and received. The two-way beacons are capable of two-way communication with terminals, providing more versatility.

Beacons may be strategically placed in an inside space. Their placement and spacing is determined by the accuracy and range of desired positioning. The terminal of a beacon may detect signals from nearby beacons and emit signals at regular intervals. The terminal of the beacon may receive the signals and calculate the strength and distance.

SUMMARY OF THE DISCLOSURE

An embodiment of the present disclosure provides an apparatus and method for providing a restaurant service based on user location using beacons.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an aspect of the present disclosure, an electronic device may include a memory and a processor connected to the memory. The processor may be configured to receive, from a user terminal, a plurality of beacon identification signals transmitted from a plurality of beacons, extract a first location of the user terminal based on the beacon identification signals, transmit, when the first location is an outside point of the restaurant, first content corresponding to event information, menu information, empty seat information, and waiting time information related to the restaurant to the user terminal, and transmit, when the first location is an inside point of the restaurant, second content corresponding to representative visitor list information about members of a group who have pre-visited the restaurant, visit confirmation request information about whether the group is visiting the restaurant, and group member count request information about the number of the members in the group, to the user terminal.

In this case, the plurality of beacons may be installed at each of the plurality of restaurants. The plurality of beacons may include a first beacon located outside the restaurant and a second beacon and third beacon located inside the restaurant, The processor may be configured to sort the beacon identification signals in descending order of values of received signal strength indicator (RSSI) and extract the first location using trilateration based on three representative beacon identification signals having the highest values of the RSSI, when the representative beacon identification signals are all related to the same restaurant, extract an inside point of the restaurant as the first location, and when the representative beacon identification signals relate to two or more restaurants, extract an outside point of a restaurant corresponding to the beacon identification signal having the highest value of the RSSI as the first location.

Here, the processor may be configured to, upon receiving response information about a visit and the number of members of the group from the user terminal in response to the second content, set the user terminal as a representative visitor terminal, transmit table location information assigned based on the number of members of the group to the representative visitor terminal, upon receiving from the user terminal response information related to a selection of a representative visitor of the group in response to the second content, set the user terminal as a group member visitor terminal, transmit the menu information and order request information related to the restaurant to the representative visitor terminal and the group member visitor terminal, and transmit, to an operator terminal of the restaurant, menu order information received from the representative visitor terminal and the group member visitor terminal in response to the order request information.

Here, at least one of the second beacon and the third beacon may be the operator terminal generating the beacon identification signals using a Bluetooth module.

In this case, the processor may be configured to, when the first location is the outside point of the restaurant: extract a first time at the first location; extract a second time earlier than the first time by a preset unit time; extract a second location corresponding to a location of the user terminal at the second time; and calculate a vector distance between the first location and the second location; when the user terminal is moved from the first location to the inside point of the restaurant: calculate a positive thinking time based on a third time of arriving at the first location and a fourth time of arriving at the inside point of the restaurant; and calculate a preference of a user of the user terminal for the restaurant based on the positive thinking time, the vector distance, and an average vector distance corresponding to an average of vector distances traveled by other users for the unit time; when the user terminal is moved from the first location to an outside point of another restaurant: calculate a negative thinking time based on a fifth time of arriving at the first location and a sixth time of arriving at the outside point of the other restaurant; and calculate a preference of the user of the user terminal for the restaurant based on the negative thinking time, the vector distance, and the average vector distance; and preferentially transmit, to the user terminal, first content about a restaurant similar in category and menu to the restaurant corresponding to the preference.

Here, the preference is calculated by the following equation:

$$P = \sum_{n=1}^{k}\left(\frac{VD\_n}{AVD} \times PTT\_n\right) - \sum_{m=1}^{j}\left(\frac{VD\_m}{AVD} \times NTT\_m\right).$$

Here, P may denote the preference, VD_n denotes the n-th vector distance, AVD may denote the average vector distance, PTT_n may denote the n-th positive thinking time, VD_m may denote the m-th vector distance, and NTT_m may denote the m-th negative thinking time, where n, m, k, and j may be integers.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a conceptual diagram of an apparatus for providing a restaurant service based on a user location using beacons, according to one embodiment of the present disclosure;

FIG. 2 is a block diagram of an electronic device according to one embodiment of the present disclosure;

FIG. 3 is an exemplary diagram of extracting a location of a user terminal at an outside point by trilateration according to one embodiment of the present disclosure;

FIG. 4 is an exemplary diagram of extracting a location of the user terminal at an inside point by trilateration according to one embodiment of the present disclosure;

FIG. 5 is an exemplary diagram of providing second content according to one embodiment of the present disclosure;

FIG. 6 is an exemplary diagram of performing a beacon function with an operator terminal according to one embodiment of the present disclosure;

FIG. 7 is an exemplary diagram of extracting a user's preference according to one embodiment of the present disclosure; and FIG. 8 is a flowchart of a method for providing a restaurant service based on a user location using beacons, according to one embodiment of the present disclosure.

It should be noted that throughout the drawings, like reference numbers are used to illustrate the same or similar elements, features and structures.

DETAILED DESCRIPTION OF THE DISCLOSURE

Hereinafter, embodiments of the present disclosure will be described in detail with reference to the accompanying drawings.

In describing the embodiments, technical details that are well known in the technical field to which the present disclosure belongs and that are not directly related to the present disclosure are omitted. This is to make the invention clearer without obscuring the main points of the disclosure by omitting unnecessary descriptions.

For the same reason, in the accompanying drawings, some components are exaggerated, omitted, or shown schematically. In addition, the dimensions of each component are not intended to be entirely reflective of its actual size. In each drawing, identical or corresponding components are assigned the same reference number.

Advantages and features of the present disclosure and the method of achieving the same will become apparent from the embodiments described in detail below with reference to the accompanying drawings. The present disclosure may, however, be embodied in many different forms and should not be construed as limited to the embodiments set forth herein. It should be understood that these embodiments are provided such that the disclosure will be thorough and complete, and will fully convey the concept of the disclosure to those skilled in the art. The scope of the disclosure is only defined by the claims. Throughout the specification, like reference numerals refer to like components.

It will be appreciated that each block of the processing flowchart illustrations and combinations of the flowchart illustrations may be performed by computer program instructions. These computer program instructions may be mounted on a processor of a general purpose computer, a special purpose computer, or other programmable data processing equipment, such that the instructions, when executed by the processor of the computer or other programmable data processing equipment, create means for performing the functions described in the flowchart block(s). These computer program instructions may be stored in a computer-available or computer-readable memory that may be directed to a computer or other programmable data processing equipment to implement the functions in a particular manner, such that the instructions stored in the computer-available or computer-readable memory may produce an article of manufacture including instruction means for performing the functions described in the flowchart block(s). The computer program instructions may also be loaded onto a computer or other programmable data processing equipment to perform a sequence of operational steps on the computer or other programmable data processing equipment to create a computer-executable process, such that the instructions for performing the computer or other programmable data processing equipment provide steps for performing the functions described in the flowchart block(s).

Further, each block may represent a module, segment, or portion of code including one or more executable instructions for performing a specified logical function(s). It should also be noted that in some alternative implementations, the functions noted in the blocks may occur out of sequence. For example, two blocks shown one after the other may in fact be performed substantially simultaneously, or the blocks may sometimes be performed in reverse order according to the functions they perform.

As used herein, the term "unit" refers to software or a hardware component, such as a field-programmable gate array (FPGA) or an application-specific integrated circuit (ASIC), wherein the "unit" performs some functions. However, the "unit" is not limited to software or hardware. The "unit" may be configured to be present on an addressable storage medium and may be configured to execute one or more processors. Thus, in one example, the "unit" includes components such as software components, object-oriented software components, class components, and task components, processes, functions, attributes, procedures, subroutines, segments of program code, drivers, firmware, microcode, circuits, data, databases, data structures, tables, arrays, and variables. The functions provided in the components and units may be combined into a smaller number of components and units or further separated into additional components and units. In addition, the components and units may be implemented to execute one or more CPUs in the device or secure multimedia card.

In describing the embodiments of the present disclosure in detail, reference will be made to examples of specific systems, but the main points claimed herein are applicable to other communication systems and services having a similar technical background without departing substantially from the scope disclosed herein, as will be apparent to those skilled in the art.

FIG. 1 is a conceptual diagram of an apparatus for providing a restaurant service based on a user location using beacons, according to one embodiment of the present disclosure.

Referring to FIG. 1, a user location-based restaurant service provision apparatus 100 using beacons according to one embodiment of the present disclosure may extract the location of a user based on a plurality of beacons installed inside and outside a restaurant, and provide content related to the restaurant to a user terminal 200 based on the location of the user. The user location-based restaurant service provision device 100 using beacons may be referred to as an "electronic device 100" in the present disclosure.

The user terminal 200 and an operator terminal 300 may include a communicable desktop computer, laptop computer, notebook, smartphone, tablet PC, mobile phone, smart watch, smart glass, e-book reader, portable multimedia player (PMP), portable gaming device, navigation device, digital camera, digital multimedia broadcasting (DMB) player, digital audio recorder, digital audio player, digital video recorder, digital video player, and personal digital assistant (PDA).

FIG. 2 is a block diagram of the electronic device 100 according to one embodiment of the present disclosure.

The electronic device 100 includes a processor 110 and a memory 120. The processor 110 may perform at least one method described above. The memory 120 may store information related to the method described above or may store a program implementing the method described above. The memory 120 may be a volatile memory or a non-volatile memory. The memory 120 may be referred to as a "database," "storage," or the like.

The processor 110 may execute programs and control the electronic device 100. The code of the program executed by the processor 110 may be stored in the memory 120. The device 100 may be connected to an external device (e.g., a personal computer or network) via an input/output device (not shown), and may exchange data with the external device.

The processor 110 may receive, from the user terminal 200, a plurality of beacon identification signals transmitted by a plurality of beacons.

Here, the term beacon is a name derived from the English word "beacon," which means a sign or signal, and refers to a communication technology for transmitting beacon identification information or various data within a radius of about m to 70 m based on Bluetooth signals.

The plurality of beacons, which are installed at each of the plurality of restaurants, may include a first beacon located outside the restaurant, a second beacon located inside the restaurant, and a third beacon.

In other words, as will be described later, at least three beacons need to be installed in order to know the location of the user.

Further, the processor 110 may extract a first location of the user terminal 200 based on the beacon identification signal.

In this case, when three or more beacons are present as described above, the location of the user may be extracted through trilateration, which will be described in detail with reference to FIGS. 3 and 4.

When the first location is an outside point of the restaurant, the processor 110 may transmit first content corresponding to event information, menu information, empty seat information, and waiting time information related to the restaurant to the user terminal 200.

In this case, the first content may include basic information about the restaurant, which may include information with an advertising function to encourage the user to visit the restaurant.

Also, when the first location is an inside point in the restaurant, the processor 110 may transmit second content corresponding to representative visitor list information about members of a group who have pre-visited the restaurant, visit confirmation request information about whether the group is visiting the restaurant, and group member count request information about the number of members in the group.

The second content may include information about services to be provided to the user at the restaurant (such as ordering food, calling a staff member, etc.). Related details will be described later with reference to FIG. 5.

FIG. 3 is an exemplary diagram of extracting a location of a user terminal 200 at an outside point by trilateration according to one embodiment of the present disclosure, and FIG. 4 is an exemplary diagram of extracting a location of the user terminal 200 at an inside point by trilateration according to one embodiment of the present disclosure.

As described above, the processor 110 may extract the location of the user based on three or more beacons. More specifically, the processor 110 may sort the beacon identification signals in descending order of values of RSSI and extract the first location using trilateration based on three representative beacon identification signals with the highest values of the RSSI.

Here, the RSSI is an abbreviation for "received signal strength indicator" and may be construed as an indicator of the received signal strength. For example, the value of RSSI usually ranges from (−)99 to (−)35. As the number for the value increases, the strength of the signal may increase. In other words, the RSSI is the most basic and only indicator used to measure the distance between a beacon and a smartphone.

In this regard, like triangulation, trilateration is a method that uses triangular geometry to determine a relative position of an object. Unlike triangulation, which uses the length of one side and two angles at both ends of the side, trilateration uses two or more reference points and the distance between the object and each reference point to determine the location of the object. In order to accurately and uniquely determine a relative position in a two-dimensional plane using trilateration alone, at least three reference points are required.

Therefore, the location of the user may be extracted by trilateration based on three or more beacons, the installation locations of the beacons, and the values of the RSSI of the beacon identification signals.

However, in one embodiment of the present disclosure, it is necessary not only to know the location of the user, but also to identify whether the user is currently inside or outside the restaurant. This is because the type of content to be provided depends on whether the user is inside or outside the restaurant.

Accordingly, the processor 110 may extract an inside point of the restaurant as the first location when the representative beacon identification signals all relate to the same restaurant. When the representative beacon identification signals relate to two or more restaurants, the processor 110 may extract an outside point of a restaurant corresponding to the beacon identification signal having the highest value of the RSSI as the first location.

Thereby, the location of the user may be extracted more accurately.

FIG. 5 is an exemplary diagram of providing second content according to one embodiment of the present disclosure.

Referring to FIG. 5, when the processor 110 receives response information about the visit and the number of members of the group from the user terminal 200 in response to the second content, the processor 110 may set the user terminal 200 as a representative visitor terminal.

This is because, when a group visits a restaurant, there may be a representative of the group, and setting a representative decision-making user in the group facilitates the procedure.

In this case, as described above, the person who clicked and entered the visit confirmation and the number of members in the second content displayed on the screen of the user terminal 200 may be set as the representative visitor immediately, and the user terminal 200 of the user who clicks the ID and/or the icon identifying the user using the representative visitor terminal displayed at the bottom of the screen of the user terminal 200 is set as a group member visitor terminal.

Then, the processor 110 may transmit table location information assigned based on the number of members of the group to the representative visitor terminal.

Here, the table location information may include location information about a table assigned based on a pre-registered number of seats and the status of the tables at the restaurant according to the number of members of the group.

Further, the processor 110 may transmit the menu information and order request information related to the restaurant to the representative visitor terminal and the group member visitor terminal. This is because it is easier for each person to select a food order from the menu.

Also, the processor 110 may transmit, to the operator terminal 300 of the restaurant, menu order information received from the representative visitor terminal and the group member visitor terminal in response to the order request information.

At the end of the meal, the processor 110 may transmit to the representative visitor terminal information requesting a type of payment for the meal. When the user of the representative visitor terminal clicks on "Collective payment" as disclosed in the figure, the processor 110 may transmit to the representative visitor terminal information related to the collective order. When the user of the representative terminal clicks on the "Individual payment" disclosed in the figure, the processor 110 may transmit information related to the individual order corresponding to the individual order menu information to the representative visitor terminal and the group member visitor terminal.

FIG. 6 is an exemplary diagram of performing a beacon function with the operator terminal 300 according to one embodiment of the present disclosure.

Referring to FIG. 6, at least one of the second beacon and the third beacon may be the operator terminal 300, which generates a beacon identification signal using a Bluetooth module.

In this case, the operator terminal 300 may be an Android device running an application and may be used instead of a beacon through an application that generates and transmits a beacon signal.

Utilizing a smartphone such as the operator terminal 300 to function as a beacon is advantageous in that it does not require separate beacon hardware and can be implemented by a POS or other guidance smart device used in a restaurant.

FIG. 7 is an exemplary diagram of extracting a user's preference according to one embodiment of the present disclosure.

To advertise a restaurant to a user, it may be more effective to prioritize restaurants that the user prefers.

Therefore, it is desirable to extract a user's preferred restaurant, and to make advertisements based thereon.

Referring to FIG. 7, when the first location is an outside point of the restaurant, the processor 110 may extract a first time from the first location, extract a second time earlier than the first time by a preset unit time, extract a second location corresponding to a location of the user terminal 200 at the second time, and calculate a vector distance between the first location and the second location.

Here, the unit time may be set by the user to, for example, 3 minutes, 5 minutes, or 10 minutes.

The vector distance is intended to estimate the user's travel speed, and may be used to calculate how long the user has been thinking in front of the restaurant. For example, a fast-moving person may be considered to have sufficiently thought for one minute, while a slow-moving person may not be considered to have sufficiently thought for one minute.

In addition, when the location of the user terminal 200 is moved from the first location to the inside point of the restaurant, the processor 110 may calculate a positive thinking time based on a third time of arriving at the first location and a fourth time of arriving at the inside point of the restaurant.

In this case, the positive thinking time may be a time difference between the fourth time and the third time.

In this case, the fact that the user has moved into the restaurant may mean that the user has decided to visit the restaurant after deliberation, and has a high preference for the restaurant.

Accordingly, the processor 110 may calculate a preference of the user of the user terminal 200 for the restaurant based on the positive thinking time, the vector distance, and an average vector distance corresponding to an average of vector distances traveled by other users for the unit time.

When the location of the user terminal 200 is moved from the first location to an outside point of another restaurant, the processor 110 may calculate a negative thinking time based on a fifth time of arriving at the first location and a sixth time of arriving at the outside point of the other restaurant.

In this case, the negative thinking time may be a time difference between the fifth time and the sixth time.

Here, the fact that the user has moved to the outside point of the other restaurant may mean that the user has decided not to visit the restaurant after deliberation and has a low preference for the restaurant.

Accordingly, the processor 110 may calculate a preference of the user of the user terminal 200 for the restaurant based on the negative thinking time, the vector distance, and the average vector distance. This preference may be a negative preference, which may be cumulatively summed with the preference calculated by the positive thinking time.

More specifically, the preference may be calculated by Equation 1 below.

$$P = \sum_{n=1}^{k}\left(\frac{VD\_n}{AVD} \times PTT\_n\right) - \sum_{m=1}^{j}\left(\frac{VD\_m}{AVD} \times NTT\_m\right) \quad \text{[Equation 1]}$$

Here, P may denote the preference, VD_n denotes the n-th vector distance, AVD may denote the average vector distance, PTT_n may denote the n-th positive thinking time, VD_m may denote the m-th vector distance, and NTT_m may denote the m-th negative thinking time, where n, m, k, and j may be integers.

Further, based on the preference, the processor 110 may preferentially transmit, to the user terminal 200, first content about a restaurant similar in category and menu to the restaurant corresponding to the preference. Thereby, the user may preferentially view information about the preferred restaurants, which may help the user to select a restaurant.

Here, the categories may be classified as Korean food, Western food, Chinese food, Japanese food, and light food, and the menus may be classified as representative menus of the restaurant, such as sundae soup, sushi, pizza, and chicken.

FIG. 8 is a flowchart of a method for providing a restaurant service based on a user location using beacons, according to one embodiment of the present disclosure.

Referring to FIG. 8, the method for providing a restaurant service based on a user location using beacons according to one embodiment of the present disclosure may include receiving, from the user terminal 200, a plurality of beacon identification signals transmitted from a plurality of beacons (S101).

Further, the method for providing a restaurant service based on a user location using beacons may include extracting a first location of the user terminal 200 based on the beacon identification signals (S103).

Further, the method for providing a restaurant service based on a user location using beacons may include transmitting first content and second content to the user terminal 200 based on the first location (S105).

More specifically, the method for providing a restaurant service based on a user location using beacons according to one embodiment of the present disclosure may include transmitting, when the first location is an outside point of a restaurant, first content corresponding event information, menu information, empty seat information, and waiting time information related to the restaurant to the user terminal 200, and transmitting, when the first location is an inside point of the restaurant, second content corresponding to representative visitor list information about members of a group who have pre-visited the restaurant, visit confirmation request information about whether the group is visiting the restaurant, and group member count request information about the number of members in the group to the user terminal 200.

In addition, the method for providing a restaurant service based on a user location using beacons according to one embodiment of the present disclosure may be configured in the same manner as the user location-based restaurant service provision apparatus 100 using beacons illustrated in FIGS. 1 to 7.

The embodiments described above may be implemented by hardware components, software components, and/or a combination of hardware components and software components. For example, the apparatus, method, and components described in the embodiments may be implemented using one or more general purpose or special purpose computers such as, for example, a processor, a controller, an arithmetic logic unit (ALU), a digital signal processor, a microcomputer, a field programmable gate array (FPGA), a programmable logic unit (PLU), microprocessors, or any other device capable of executing and responding to instructions. A processing unit may run an operating system (OS) and one or more software applications executed on the OS. The processing unit may also access, store, manipulate, process, and generate data in response to execution of software. While it is described for convenience of understanding that one processing unit is used, those skilled in the art will understand that the processing unit may include a plurality of processing elements and/or a plurality of types of processing elements. For example, the processing unit may include a plurality of processors or one processor and a controller. Other processing configurations such as parallel processors are also possible.

The method according to the embodiment may be implemented in the form of program instructions that may be executed through various computer means and recorded on a computer-readable medium. The computer-readable medium may include program instructions, data files, and data structures alone or in combination. The program instructions recorded on the medium may be specially designed and configured for the embodiments or may be known and available to those skilled in computer software. Examples of the computer-readable recording media include magnetic media such as hard disks, floppy disks and magnetic tapes, optical media such as CD-ROMs and DVDs, magneto-optical media such as floptical disks, and hardware devices specially configured to store and execute program instructions, such as ROM, RAM, and flash memory. Examples of program instructions include high-level language codes that may be executed by a computer using an interpreter, as well as machine language codes such as those produced by a compiler. The hardware devices described above may be configured to operate as one or more software modules to perform the operations of the embodiments, and vice versa.

Software may include a computer program, code, instructions, or a combination of one or more of the foregoing, and may configure a processing unit to operate as desired or independently or collectively instruct the processing unit. Software and/or data may be permanently or temporarily embodied in any type of machine, component, physical device, virtual equipment, computer storage medium or device, or a transmitted signal wave in order to be interpreted by or provide instructions or data to a processing unit. Software may be distributed on networked computer systems and may be stored or executed in a distributed manner. The software and data may be stored on one or more computer-readable media.

As apparent from the above description, the present disclosure provides the following effects.

According to an embodiment of the present disclosure, an apparatus and method for providing a restaurant service based on user location using beacons may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

As disclosed above, the embodiments have been described by limited drawings. However, those skilled in the art may apply various technical modifications and variations based on the above. For example, the described techniques may be carried out in an order different from the method described, and/or components of the described system, structure, apparatus, circuit, and the like may be coupled or combined in a different form than the method described, or replaced or substituted by other components or equivalents that may achieve appropriate results.

Therefore, other implementations, other embodiments, and equivalents of the claims are also within the scope of the accompanying claims.

What is claimed is:

1. An electronic device comprising:
a memory; and
a processor connected to the memory,
wherein the processor is configured to:
receive, from a user terminal, a plurality of beacon identification signals transmitted from a plurality of beacons;
extract a first location of the user terminal based on the beacon identification signals;
transmit, when the first location is an outside point of the restaurant, first content corresponding to event information, menu information, empty seat information, and waiting time information related to the restaurant to the user terminal; and
transmit, when the first location is an inside point of the restaurant, second content corresponding to representative visitor list information about members of a group who have pre-visited the restaurant, visit confirmation request information about whether the group is visiting the restaurant, and group member count request information about the number of the members in the group, to the user terminal;
wherein the plurality of beacons is installed at each of the plurality of restaurants, the plurality of beacons comprising a first beacon located outside the restaurant and a second beacon and third beacon located inside the restaurant,
wherein the processor is configured to:
sort the beacon identification signals in descending order of values of received signal strength indicator (RSSI), and extract the first location using trilateration based on three representative beacon identification signals having the highest values of the RSSI;
when the representative beacon identification signals are all related to the same restaurant, extract an inside point of the restaurant as the first location; and
when the representative beacon identification signals relate to two or more restaurants, extract an outside point of a restaurant corresponding to the beacon identification signal having the highest value of the RSSI as the first location, and
wherein the processor is configured to:
upon receiving response information about a visit and the number of members of the group from the user terminal in response to the second content, set the user terminal as a representative visitor terminal;
transmit table location information assigned based on the number of members of the group to the representative visitor terminal;
upon receiving from the user terminal response information related to a selection of a representative visitor of the group in response to the second content, set the user terminal as a group member visitor terminal;
transmit the menu information and order request information related to the restaurant to the representative visitor terminal and the group member visitor terminal; and
transmit, to an operator terminal of the restaurant, menu order information received from the representative visitor terminal and the group member visitor terminal in response to the order request information.

2. The electronic device of claim 1, wherein at least one of the second beacon and the third beacon is the operator terminal generating the beacon identification signals using a Bluetooth module.

3. The electronic device of claim 2, wherein the processor is configured to:
when the first location is the outside point of the restaurant: extract a first time at the first location; extract a second time earlier than the first time by a preset unit time; extract a second location corresponding to a location of the user terminal at the second time; and calculate a vector distance between the first location and the second location;
when the user terminal is moved from the first location to the inside point of the restaurant: calculate a positive thinking time based on a third time of arriving at the first location and a fourth time of arriving at the inside point of the restaurant; and calculate a preference of a user of the user terminal for the restaurant based on the positive thinking time, the vector distance, and an average vector distance corresponding to an average of vector distances traveled by other users for the unit time;
when the user terminal is moved from the first location to an outside point of another restaurant: calculate a negative thinking time based on a fifth time of arriving at the first location and a sixth time of arriving at the outside point of the other restaurant; and calculate a preference of the user of the user terminal for the restaurant based on the negative thinking time, the vector distance, and the average vector distance; and
preferentially transmit, to the user terminal, first content about a restaurant similar in category and menu to the restaurant corresponding to the preference.

* * * * *